US009165168B2

(12) United States Patent
Suzuki et al.

(10) Patent No.: US 9,165,168 B2
(45) Date of Patent: Oct. 20, 2015

(54) MAGNETIC CARD READER

(71) Applicants: Takanori Suzuki, Kanagawa (JP);
Yuichiro Yamada, Kanagawa (JP);
Kenta Nakai, Kanagawa (JP)

(72) Inventors: Takanori Suzuki, Kanagawa (JP);
Yuichiro Yamada, Kanagawa (JP);
Kenta Nakai, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 14/385,553

(22) PCT Filed: Feb. 21, 2013

(86) PCT No.: PCT/JP2013/055264
§ 371 (c)(1),
(2) Date: Sep. 16, 2014

(87) PCT Pub. No.: WO2013/146052
PCT Pub. Date: Oct. 3, 2013

(65) Prior Publication Data
US 2015/0102107 A1    Apr. 16, 2015

(30) Foreign Application Priority Data
Mar. 29, 2012  (JP) ................................ 2012-077598

(51) Int. Cl.
*G06K 7/08*         (2006.01)
*G11B 20/10*        (2006.01)
(Continued)

(52) U.S. Cl.
CPC ............ *G06K 7/084* (2013.01); *G11B 5/00808* (2013.01); *G11B 5/09* (2013.01); *G11B 20/10* (2013.01); *G11B 2220/17* (2013.01)

(58) Field of Classification Search
CPC ........... G06K 5/00; G06K 7/08; G06K 19/00; G06K 19/06
USPC .......................... 235/449, 380, 487, 492, 493
See application file for complete search history.

(56) References Cited

U.S. PATENT DOCUMENTS

| 4,885,458 A | * | 12/1989 | Horiguchi et al. | 235/454 |
| 5,451,762 A | * | 9/1995 | Hayashi | 235/487 |
| 6,289,427 B1 | * | 9/2001 | Tanaka | 711/201 |

FOREIGN PATENT DOCUMENTS

| CN | 2466711 Y | 12/2001 |
| CN | 201069576 Y | 6/2008 |

(Continued)

OTHER PUBLICATIONS

International Search Report to PCT/JP2013/055264 dated Apr. 2, 2013.

(Continued)

*Primary Examiner* — Edwyn Labaze
(74) *Attorney, Agent, or Firm* — Sughrue Mion, PLLC

(57) ABSTRACT

In order to perform processing of analyzing card data in an appropriate amount of time depending on the number of tracks actually present on a magnetic stripe with use of a single demodulation circuit, the single demodulation circuit produces, based on magnetic data read by a magnetic head, a single common card running signal obtained by ORing card running signals of tracks present on the magnetic stripe of the magnetic card, a clock signal of each track present on the magnetic stripe, and a data signal of each track present on the magnetic stripe. A card running signal generation circuit generates, based on the common card running signal and the clock signal of each track, an individual card running signal of each track present on the magnetic stripe. A data analysis processing unit determines, based on presence or absence of the individual card running signal, presence or absence of a track on the magnetic stripe to perform processing of analyzing the data signal only for the track determined to be present on the magnetic stripe.

7 Claims, 12 Drawing Sheets

(51) Int. Cl.
*G11B 5/008* (2006.01)
*G11B 5/09* (2006.01)

(56) References Cited

FOREIGN PATENT DOCUMENTS

| | | |
|---|---|---|
| CN | 102117622 A | 7/2011 |
| JP | 60-167162 A | 8/1985 |
| JP | 60-166867 U | 11/1985 |
| JP | 61-147328 A | 7/1986 |
| JP | 11-328604 A | 11/1999 |
| JP | 2002-056606 A | 2/2002 |
| JP | 2002-312133 A | 10/2002 |
| WO | 03/015083 A1 | 2/2003 |

OTHER PUBLICATIONS

Office Action for Corresponding JP 2012-077598 dated Mar. 27, 2013.
Written Opinion of PCT/JP2013/055264 dated Apr. 2, 2013.
Communication dated Mar. 19, 2015, issued by the State Intellectual Property Office of the People's Republic of China in counterpart Application No. 201380015663.4.

* cited by examiner

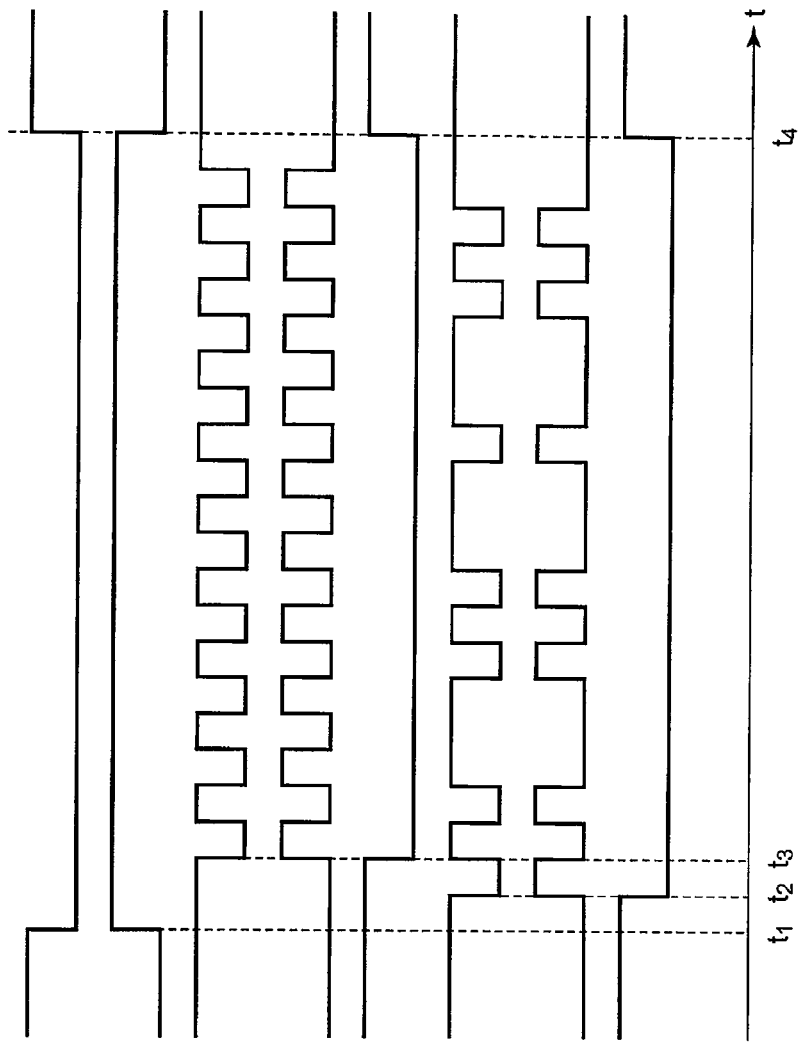

MAGNETIC CARD READER

CROSS REFERENCE TO RELATED APPLICATIONS

This application is a National Stage of International Application No. PCT/JP2013/055264 filed Feb. 21, 2013, claiming priority based on Japanese Patent Application No. 2012-077598, filed Mar. 29, 2012, the contents of all of which are incorporated herein by reference in their entirety.

TECHNICAL FIELD

This invention relates to a magnetic card reader, and more particularly, to a magnetic card reader configured to support reading of a magnetic card having one or a plurality of tracks on a magnetic stripe.

BACKGROUND ART

In a terminal having a magnetic card reader function to enable payment through magnetic cards such as a credit card and a debit card, in order to read each of the magnetic cards, a function of reading three tracks (ISO 1 track, ISO 2 track, and JIS-II track) formed on a magnetic stripe is required (for example, see Patent Literatures 1 to 3).

PRIOR ART DOCUMENTS

Patent Document

Patent Document 1: JP-A-2002-56606
Patent Document 2: JP-A-H11-328604
Patent Document 3: JP-A-S60-166867

SUMMARY OF INVENTION

Problems to be Solved by the Invention

In an actual case, however, (the number and type of) tracks present on the magnetic stripe differ depending on the type of the magnetic card. Specifically, a general (normal) credit card has all of the three tracks on the magnetic stripe, but a specific credit card has only the ISO 2 track on the magnetic stripe. Further, a debit card has only the JIS-II track on the magnetic stripe.

In the conventional magnetic card reader, there is no system to limit processing to only the track present on the magnetic stripe. As a result, there arises a problem in that, even when the conventional magnetic card reader reads a magnetic card having only one of the three tracks on the magnetic stripe, such as a specific credit card or a debit card, the processing of analyzing card data is performed for all of the three tracks.

Specifically, when the conventional magnetic card reader is a magnetic card reader configured to support reading of a plurality of tracks by a single demodulation circuit, the demodulation circuit produces only a single card running signal common to all of the tracks, which is a signal obtained by ORing the card running signals of all of the tracks. The single card running signal common to all of the tracks is hereinafter called a "common card running signal." The presence or absence of the track is determined based on the presence or absence of the common card running signal. A data analysis processing unit performs processing of analyzing card data only for a track determined to be "present". Therefore, the conventional magnetic card reader has a problem in that, even when reading such a magnetic card that only one of all of the tracks is present on the magnetic stripe, the data analysis processing unit performs processing of analyzing card data also for the track that is absent on the magnetic stripe.

As an example, description is given of a case where a specific credit card is read by the conventional magnetic card reader configured to support reading of a magnetic card having three tracks of ISO 1 track, ISO 2 track, and JIS-II track on the magnetic stripe.

Only the ISO 2 track is present on the magnetic stripe of the specific credit card, but the common card running signal produced by the single demodulation circuit is a common signal for three tracks. Therefore, the conventional magnetic card reader determines that the ISO 1 track and the JIS-II track that are absent on the magnetic stripe are "present" due to the presence of the common card running signal. Therefore, the data analysis processing unit of the conventional magnetic card reader performs the processing of analyzing the card data for all of the tracks. In other words, in the conventional magnetic card reader, the processing of analyzing the card data cannot be performed in an appropriate amount of time depending on the number of tracks actually present on the magnetic stripe.

On the other hand, if a plurality of demodulation circuits, each of which produces a signal for one track, are used, the above-mentioned problem does not occur. However, a magnetic card reader including a plurality of demodulation circuits is increased in cost. Further, such a magnetic card reader requires a mounting space for the plurality of demodulation circuits, which interferes with downsizing of the device.

It is therefore an object of this invention to provide a magnetic card reader configured to use a single demodulation circuit to enable processing of analyzing card data in an appropriate amount of time depending on the number of tracks actually present on a magnetic stripe.

Means to Solve the Problem

According to one embodiment of this invention, there is provided a magnetic card reader, which is configured to support reading of magnetic data from a magnetic card having one to N tracks on a magnetic stripe, where N is an integer of 2 or more, the magnetic card reader including: a magnetic head configured to read, from the magnetic card, the magnetic data of each of tracks present on the magnetic stripe; a single demodulation circuit configured to produce, based on the magnetic data, a single common card running signal obtained by ORing card running signals of the tracks present on the magnetic stripe, a clock signal of the each of the tracks present on the magnetic stripe, and a data signal of the each of the tracks present on the magnetic stripe; a card running signal generation circuit configured to generate, based on the single common card running signal and the clock signal of the each of the tracks, an individual card running signal of the each of the tracks present on the magnetic stripe; and a data analysis processing unit configured to determine presence or absence of a track on the magnetic stripe based on presence or absence of the individual card running signal and to perform processing of analyzing the data signal only for the track determined to be present on the magnetic stripe.

Advantageous Effects of Invention

With the use of the single demodulation circuit, the processing of analyzing the card data can be performed in the appropriate amount of time depending on the number of tracks actually present on the magnetic stripe.

BRIEF DESCRIPTION OF DRAWINGS

FIGS. 12A to 12I are signal waveform diagrams of a case where a magnetic card (credit card) having three tracks on a magnetic stripe is read by the magnetic card reader illustrated in FIG. 9.

MODES FOR EMBODYING THE INVENTION

First, a feature of this invention will be described.

According to this invention, in a magnetic card reader configured to support reading of a magnetic card having one to N (N is an integer of 2 or more) tracks on a magnetic stripe, a card running signal generation circuit generates an individual card running signal dedicated to each track based on a common card running signal common to the respective tracks and a clock signal of each track, which are produced by a demodulation circuit. In this manner, when a magnetic card having only a specific track on the magnetic stripe is read, software can determine presence or absence of the track.

That is, the feature of this invention resides in that, when the magnetic card is read, the common card running signal common to all of the tracks and the reading clock signal of each track, which are produced by the demodulation circuit, are used to generate the individual card running signal dedicated to each track.

The presence or absence of each track of the magnetic stripe can be determined by the generated individual card running signal dedicated to each track, and hence processing of analyzing card data can be performed only for the track present on the magnetic stripe of the magnetic card.

With this, it is possible to limit the processing of analyzing the card data to only the track present on the magnetic stripe of the magnetic card, and the processing of analyzing the card data is not performed to a track absent on the magnetic stripe. Therefore, the software is prevented from performing unnecessary processing. Therefore, the processing of analyzing the card data can be performed in an appropriate amount of time depending on the number of tracks.

Example 1

Figure 1:
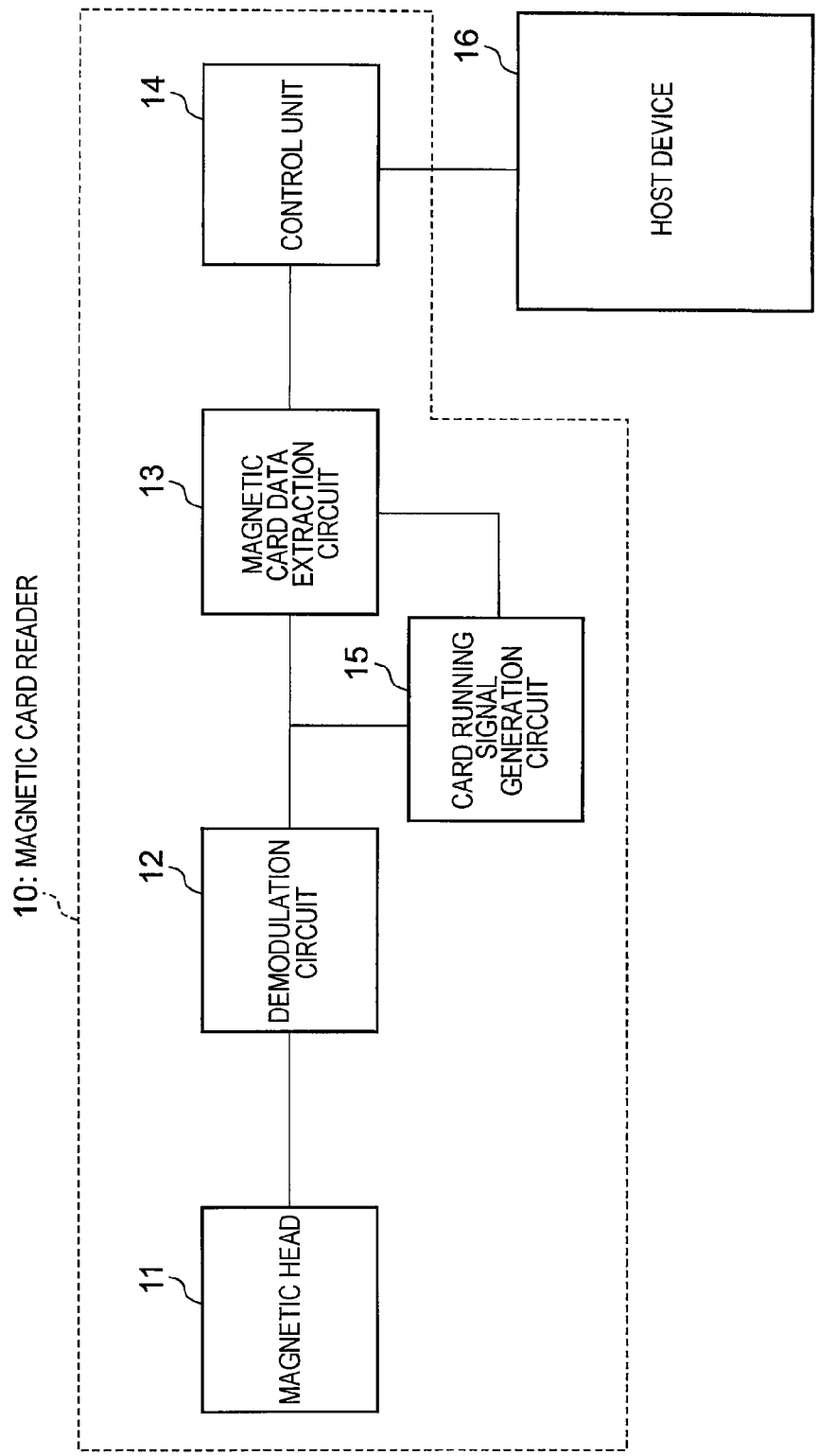
FIG. 1 is a block diagram illustrating a configuration of a magnetic card reader according to a first example of this invention.

FIG. 1 is a block diagram illustrating a configuration of a magnetic card reader 10 according to a first example of this invention. The illustrated magnetic card reader 10 is a magnetic card reader configured to support reading of magnetic data from a magnetic card (not shown) having one to N (N is an integer of 2 or more) tracks on a magnetic stripe. In the illustrated example, N is equal to 3.

The illustrated magnetic card reader 10 comprises a magnetic head 11, a demodulation circuit 12, a magnetic card data extraction circuit 13, a control unit 14, and a card running signal generation circuit 15.

The magnetic head 11 converts, when the magnetic card is scanned, the magnetic stripe of the magnetic card into an electrical signal with an analog waveform to produce the converted electrical signal as magnetic data (analog signal) of the magnetic card. In this case, as the magnetic head 11, a three-track readable magnetic head is used. As described above, the magnetic head 11 reads magnetic data of each track present on the magnetic stripe from the magnetic card.

The demodulation circuit 12 amplifies the analog signal produced by the magnetic head 11, and then demodulates the amplified analog signal by an F2F format (magnetic record format), to thereby convert the analog signal into digital signals. The demodulation circuit 12 produces the converted digital signals as three types of signals of a card running signal, clock signals, and data signals, which are serial signals. In this case, as the demodulation circuit 12, a three-track readable demodulation circuit in which readable tracks are equal in number to three is used. The clock signals and the data signals are produced for each track, but only a single card running signal is produced as a signal common to all of the tracks (ORed signal of card running signals of all of the tracks). This card running signal is called a common card running signal.

As described above, the demodulation circuit 12 produces, based on the magnetic data, the single common card running signal obtained by ORing the card running signals of the tracks present on the magnetic stripe, the clock signals (first to third clock signals) of the respective tracks present on the magnetic stripe, and the data signals (first to third data signals) of the respective tracks present on the magnetic stripe.

Figure 2:
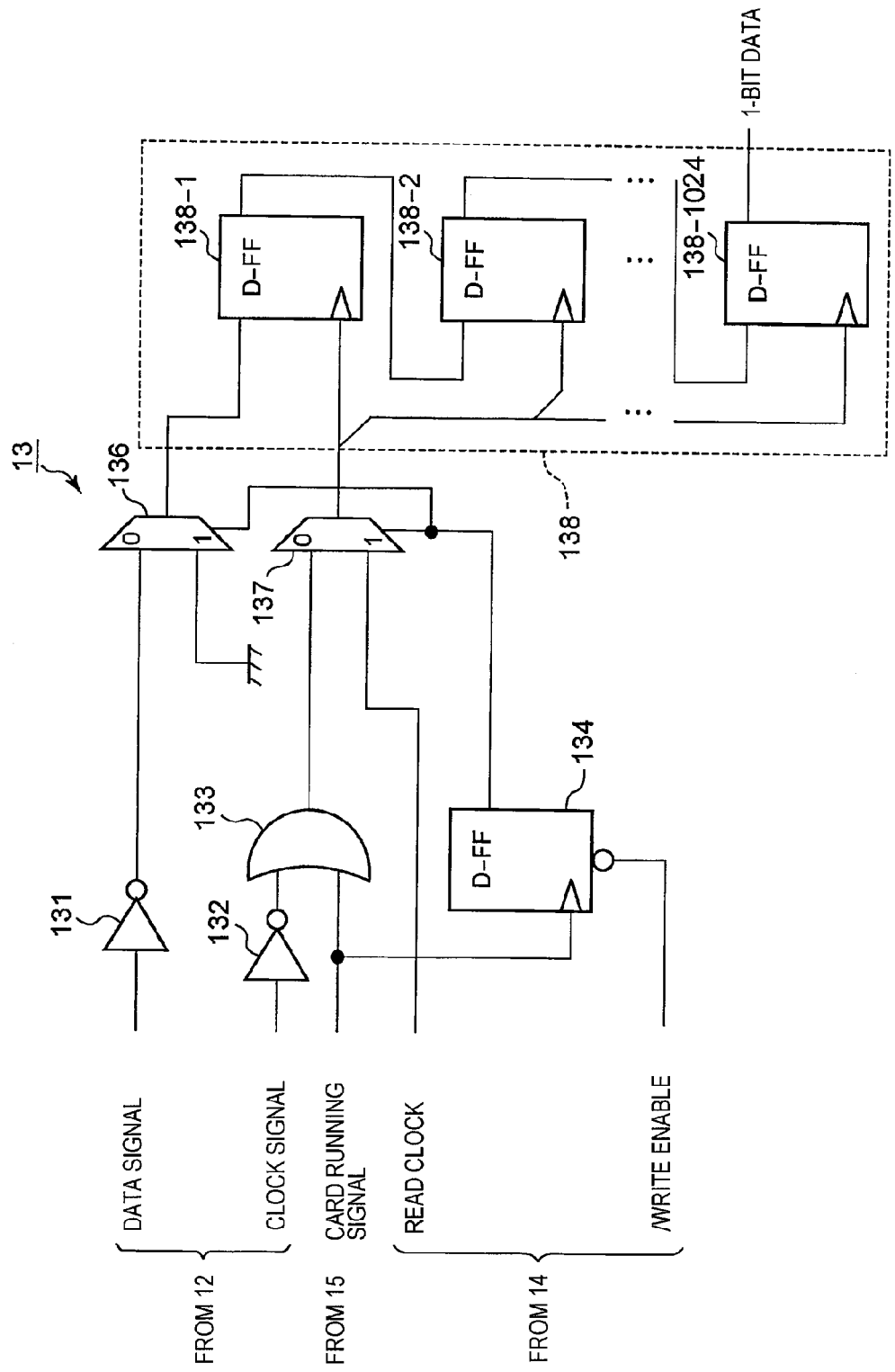
FIG. 2 is a block diagram illustrating a configuration of a magnetic card data extraction circuit used in the magnetic card reader illustrated in FIG. 1.

The magnetic card data extraction circuit 13 coverts the serial signals produced by the demodulation circuit 12 into bit strings, and stores the bit strings into a data register 138 (see FIG. 2).

FIG. 2 is a block diagram illustrating the configuration of the magnetic card data extraction circuit 13. The magnetic card data extraction circuit 13 has a block illustrated in FIG. 2 for each track. In other words, the three-track magnetic card reader 10 is used herein, and hence there are three blocks illustrated in FIG. 2.

Figure 3:
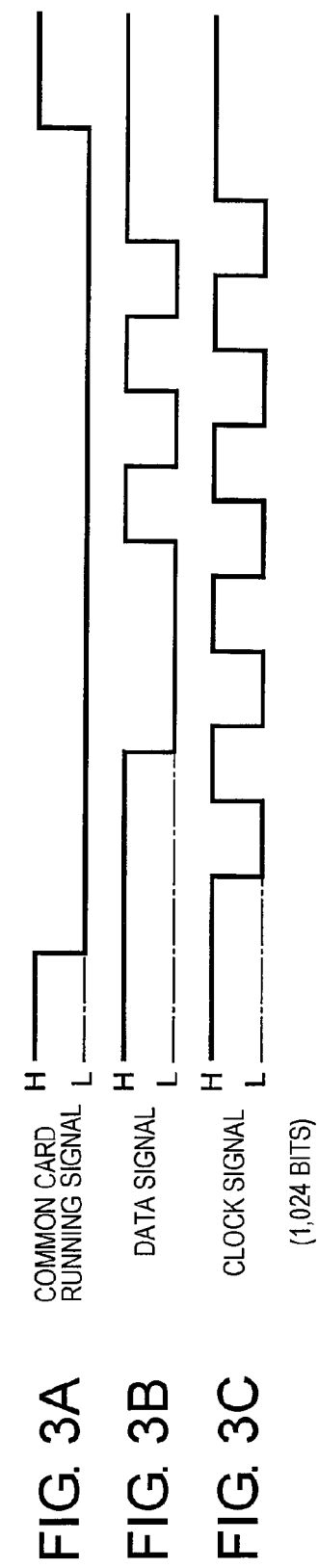
FIGS. 3A to 3C are diagrams illustrating waveforms of signals produced by a demodulation circuit used in the magnetic card reader illustrated in FIG. 1.

FIGS. 3A to 3C illustrate waveforms of signals produced by the demodulation circuit 12 to be supplied to the magnetic card data extraction circuit 13.

The magnetic card data extraction circuit 13 comprises, for each track, a first inverter (NOT gate) 131, a second inverter (NOT gate) 132, an OR gate 133, a D-type flip-flop (D-FF) 134, a first selection circuit 136, a second selection circuit 137, and the data register 138.

The first inverter 131 inverts the data signal to produce an inverted data signal. The second inverter 132 inverts the clock signal to produce an inverted clock signal. The OR gate 133 ORs the inverted clock signal and the card running signal to produce an OR result signal.

The D-type flip-flop 134 includes a clock input terminal CK supplied with the card running signal, and a clear terminal supplied with /write enable from the control unit 14. The D-type flip-flop 134 produces a held signal from its non-inverting output terminal. This held signal is supplied to control terminals of the first and second selection circuits 136 and 137. The first and second selection circuits 136 and 137 select, in response to the held signal, one of a "0" side input signal and a "1" side input signal to produce first and second selected signals, respectively.

In the first selection circuit 136, the "0" side is supplied with the inverted data signal, and the "1" side is grounded to be supplied with a signal at an "L" level. Therefore, the first selection circuit 136 produces a signal at the "L" level as the first selected signal when the held signal is at an "H" level, and produces the inverted data signal as the first selected signal when the held signal is at the "L" level.

In the second selection circuit 137, the "0" side is supplied with the OR result signal, and the "1" side is supplied with a read clock from the control unit 14. Therefore, the second selection circuit 137 produces the read clock as the second selected signal when the held signal is at the "H" level, and produces the OR result signal as the second selected signal when the held signal is at the "L" level.

The data register 138 is a 1,024-bit memory including 1,024 D-type flip-flops (D-FFs) 138-1 to 138-1024. The first selected signal is supplied to a data input terminal of the D-type flip-flop 138-1 at the first stage. An output signal of a D-type flip-flop 138-$i$ at an i-th stage is supplied to a data input terminal of a D-type flip-flop 138-$(i+1)$ at an (i+1)th stage, where $1 \leq i \leq 1,023$ is satisfied. The second selected signal is supplied to clock input terminals of the 1,024 D-type flip-flops 138-1 to 138-1024. Therefore, the data register 138 holds 1-bit data from the data signal, and sets the held data in the register, which can be read from the control unit 14 by 1-bit (1024-bit memory) first-in first-out (FIFO).

That is, the magnetic card data extraction circuit 13 includes, for the respective tracks, the data registers (first to third data registers) 138 configured to hold the data signals (first to third data signals) of the respective tracks in synchronization with the clock signals (first to third clock signals) of the respective tracks based on the individual card running signals (described later) of the respective tracks.

With the magnetic card data extraction circuit 13 having such a configuration, when the output (held signal) of the D-type flip-flop 134 is at the "L" level, the data register 138 holds the data signal in synchronization with the clock signal. On the other hand, when the output (held signal) of the D-type flip-flop 134 is at the "H" level, the data register 138 produces the held data signal in synchronization with the read clock supplied from the control unit 14.

The waveforms of the signals produced by the demodulation circuit 12 are as illustrated in FIGS. 3A to 3C, and the respective signals are now described. FIG. 3A illustrates the common card running signal, FIG. 3B illustrates the data signal, and FIG. 3C illustrates the clock signal. Note that, the waveforms of FIGS. 3A to 3C are different from signals actually obtained from the magnetic card in the length of the common card running signal, the number of data signals, and the number of clock signals. Further, the data signal and the clock signal are illustrated only for one track.

The common card running signal illustrated in FIG. 3A is a signal representing a running state of the magnetic card. The common card running signal is generated from preamble data, card data, and postamble data of each track. The common card running signal produces as the "L" level when running the card, and is otherwise set to the "H" level during the stand-by state.

The data signal illustrated in FIG. 3B is card information (card data) read from each track present on the magnetic stripe of the magnetic card. The data signal is produced by binarizing (0 or 1) the card information.

The clock signal illustrated in FIG. 3C is a signal read from the clock data of each track. At a timing at which this clock signal falls, the value of the data signal is taken out. That is, when the clock signal falls, each of the D-type flip-flops 138-1 to 138-1024 of the data register 138 holds 1-bit data. Therefore, the data register 138 holds a total of 1024-bit data signals.

Turning back to FIG. 1, the control unit 14 is configured to control the entire magnetic card reader 10. The control unit 14 performs processing of analyzing the card information (card data) read from the magnetic card and transmits the result to a host device 16.

The card running signal generation circuit 15 uses the common card running signal and the clock signal of each track, which are produced by the demodulation circuit 12, to generate the individual card running signal for each track. Specifically, the card running signal generation circuit 15 uses the common card running signal and the clock signals (first to third clock signals) of the respective tracks to generate a first individual card running signal dedicated to a first track, a second individual card running signal dedicated to a second track, and a third individual card running signal dedicated to a third track.

The host device 16 is a host device such as a payment terminal or a POS device, which is connected to the magnetic card reader 10.

Figure 4:
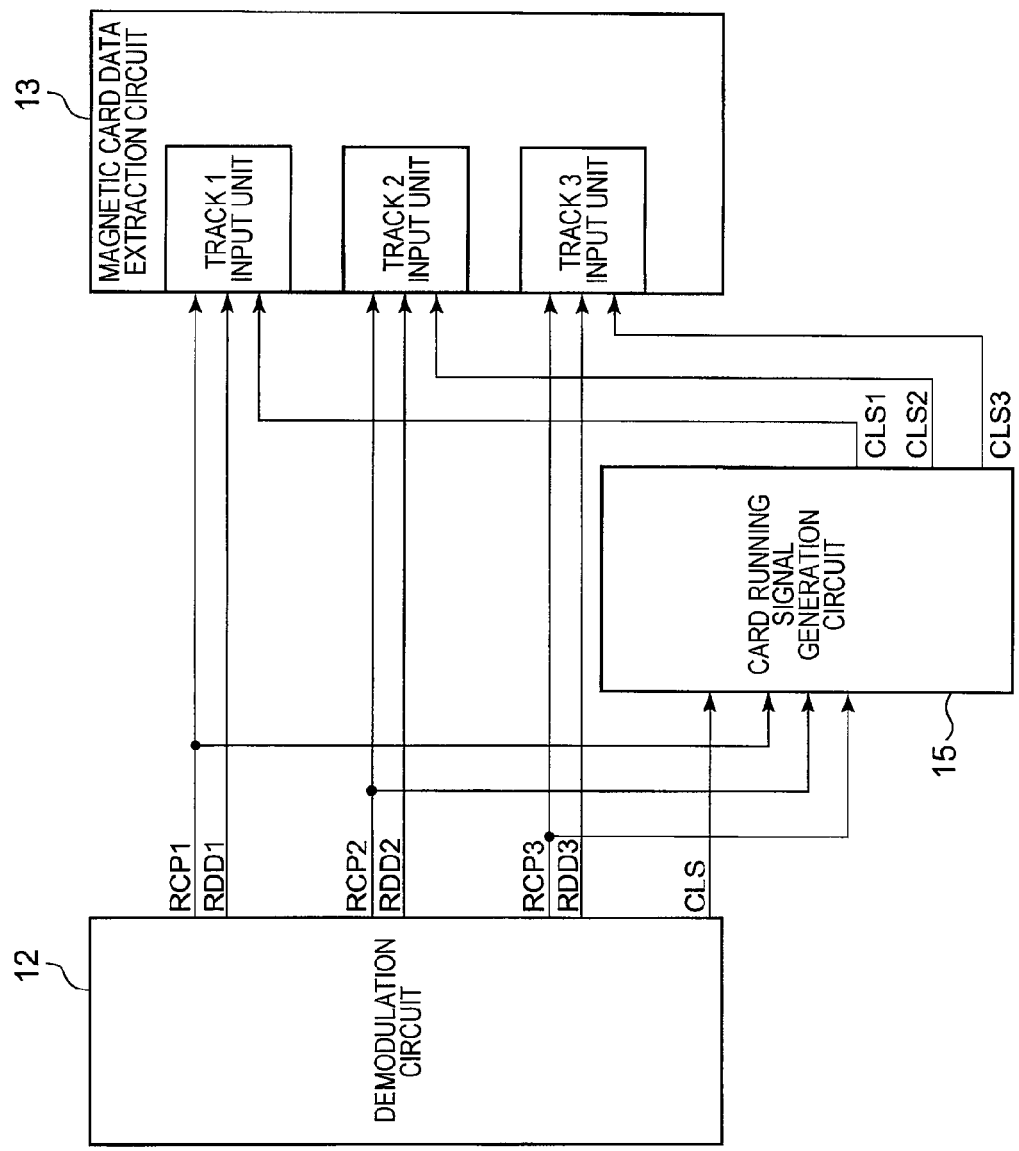
FIG. 4 is a block diagram illustrating wire connection of the demodulation circuit, a card running signal generation circuit, and the magnetic card data extraction circuit, which are used in the magnetic card reader illustrated in FIG. 1.

FIG. 4 is a block diagram illustrating wire connection of the demodulation circuit 12, the card running signal generation circuit 15, and the magnetic card data extraction circuit 13 illustrated in FIG. 1. In FIG. 4, CLS* as a signal name represents a card running signal, RDD* represents a data signal, and RCP* represents a clock signal. Further, the number of * represents the track number.

Figure 5:
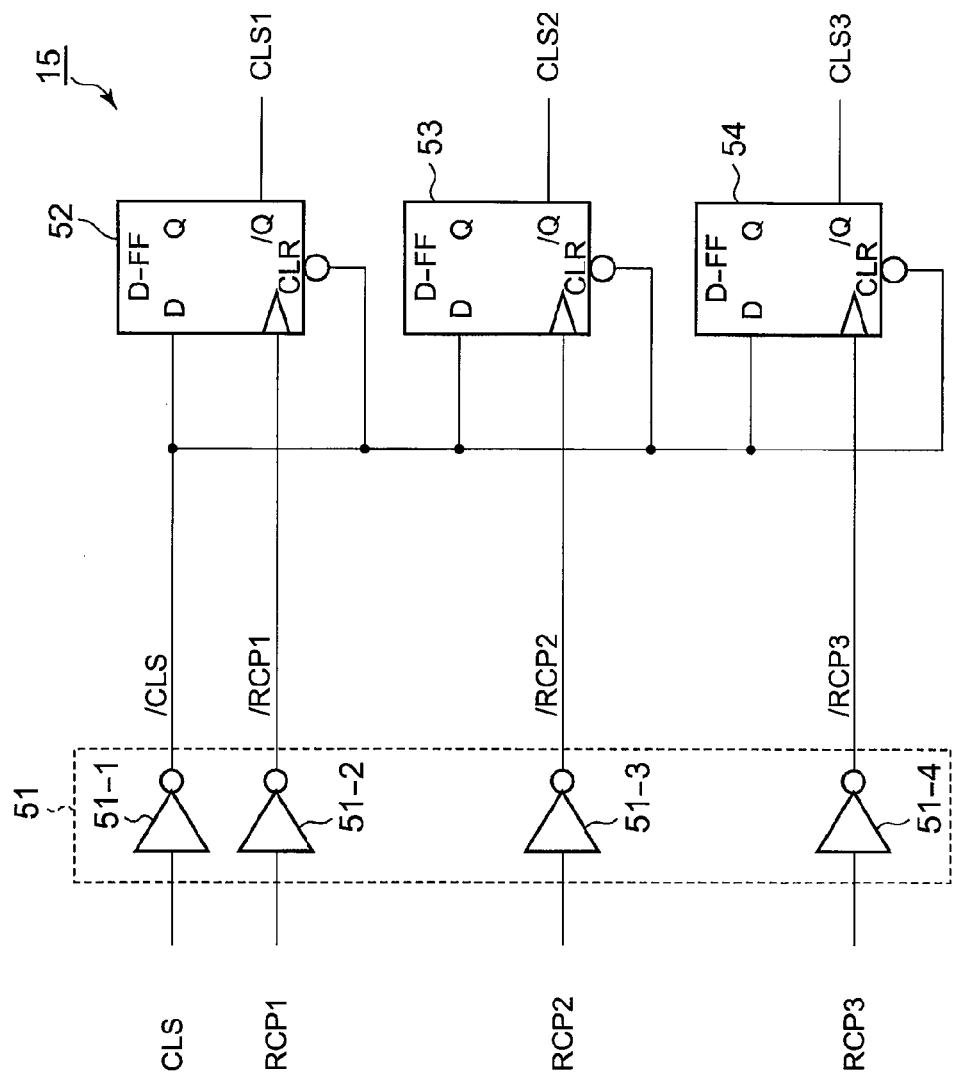
FIG. 5 is a block diagram specifically illustrating the card running signal generation circuit used in the magnetic card reader illustrated in FIG. 1.

FIG. 5 is a block diagram specifically illustrating the card running signal generation circuit 15.

The illustrated card running signal generation circuit 15 comprises a NOT circuit 51, and first through third D-type flip-flops 52, 53, and 54. The NOT circuit 51 comprises first through fourth inverters 51-1, 51-2, 51-3, and 51-4.

The first inverter 51-1 inverts the common card running signal CLS to produce an inverted common card running signal /CLS. The second inverter 51-2 inverts the first clock signal RCP1 dedicated to the first track to produce a first inverted clock signal /RCP1. The third inverter 51-3 inverts the second clock signal RCP2 dedicated to the second track to produce a second inverted clock signal /RCP2. The fourth inverter 51-4 inverts the third clock signal RCP3 dedicated to the third track to produce a third inverted clock signal /RCP3.

The inverted common card loading signal /CLS is supplied to data input terminals D and clear terminals CLR of the first through third D-type flip-flops 52 to 54. The first to third inverted clock signals /RCP1, /RCP2, and /RCP3 are supplied to clock input terminals CK of the first through third D-type flip-flops 52, 53, and 54, respectively.

The first D-type flip-flop 52 holds the inverted common card running signal /CLS in response to the first inverted clock signal /RCP1, and produces the held signal from its inverting output terminal /Q as the first individual card running signal CLS1 dedicated to the first track.

The second D-type flip-flop 53 holds the inverted common card running signal /CLS in response to the second inverted clock signal /RCP2, and produces the held signal from its inverting output terminal /Q as the second individual card running signal CLS2 dedicated to the second track.

The third D-type flip-flop 54 holds the inverted common card running signal /CLS in response to the third inverted clock signal /RCP3, and produces the held signal from its inverting output terminal /Q as the third individual card running signal CLS3 dedicated to the third track.

As described above, the card running signal generation circuit 15 is a circuit for generating, based on the common card running signal CLS and the clock signals (first to third clock signals) RCP1, RCP2, and RCP3 of the respective tracks, the individual card running signals (first to third individual card running signals) CLS1, CLS2, and CLS3 of the respective tracks present on the magnetic stripe.

Next, an operation of the first example will be described.

FIGS. 6A to 6L are signal waveform diagrams of a case where a magnetic card (credit card) having three tracks on the magnetic stripe is read. Note that, the waveforms of FIGS. 6A to 6L differ from signals actually obtained from the magnetic card in the length of the card loading signal and the number of clock signals.

Figure 6:
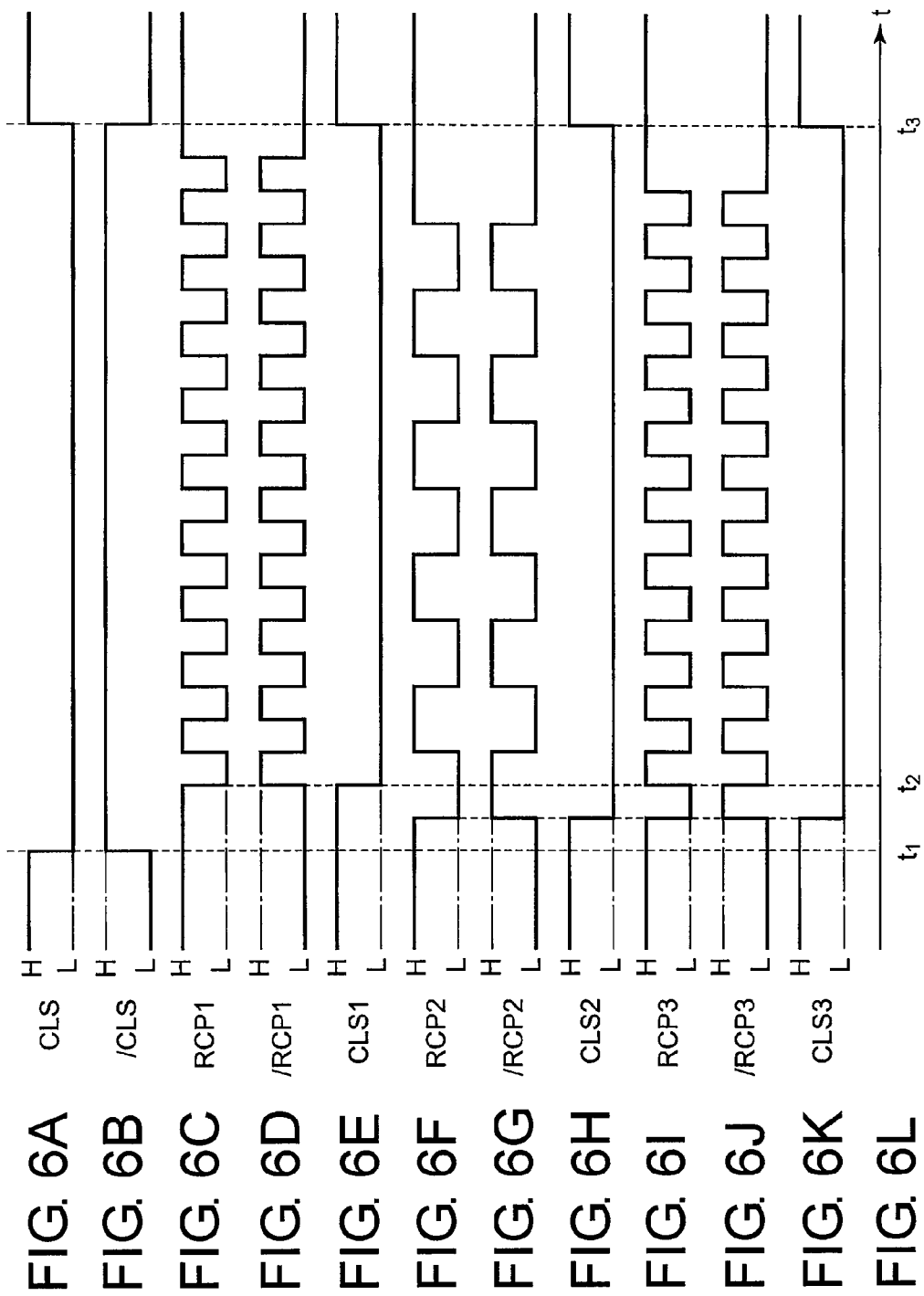
FIGS. 6A to 6L are signal waveform diagrams of a case where a magnetic card (credit card) having three tracks on a magnetic stripe is read by the magnetic card reader illustrated in FIG. 1.

FIG. 6A illustrates a waveform of the common card running signal CLS, FIG. 6B illustrates a waveform of the inverted common card running signal /CLS, FIG. 6C illustrates a waveform of the first clock signal RCP1, FIG. 6D illustrates a waveform of the first inverted clock signal /RCP1, FIG. 6E illustrates a waveform of the first individual card running signal CLS1, FIG. 6F illustrates a waveform of the second clock signal RCP2, FIG. 6G illustrates a waveform of the second inverted clock signal /RCP2, FIG. 6H illustrates a waveform of the second individual card running signal CLS2, FIG. 6I illustrates a waveform of the third clock signal RCP3, FIG. 6J illustrates a waveform of the third inverted clock signal /RCP3, and FIG. 6K illustrates a waveform of the third individual card running signal CLS3. Note that, FIG. 6L represents a time instant.

The basic operation is the same among all of the first to third tracks. Therefore, the operation in the first track is described herein as a typical example.

When the magnetic card is swiped through the magnetic head 11, simultaneously with the start of card running, at a time point $t_1$ of FIG. 6L, the common card running signal CLS falls from the "H" level to the "L" level. As a result, both inputs to the data input terminal D and the clear terminal CLR of the first D-type flip-flop 52 become the "H" level, and hence the reset of the first D-type flip-flop 52 is cancelled to become a state of waiting for an input of a clock.

At the time point $t_1$, there is still no input of an edge to the clock input terminal CK of the first D-type flip-flop 52, and hence the "H" level is produced by the inverting output terminal /Q of the first D-type flip-flop 52 similarly to the reset period.

After that, at a time point $t_2$ of FIG. 6L, the first clock signal RCP1 falls. At the same time, the rising edge of the first inverted clock signal /RCP1 is supplied to the clock input terminal CK of the first D-type flip-flop 52. Therefore, the output of the inverting output terminal /Q of the first D-type flip-flop 52 changes from the "H" level to the "L" level. That is, the first D-type flip-flop 52 produces the first individual card running signal CLS1 at the "L" level from the time point $t_2$ (see FIG. 6E).

Simultaneously with the end of the running of the magnetic card through the magnetic head 11, at a time point $t_3$ of FIG. 6L, the common card running signal CLS rises. As a result, both inputs to the data input terminal D and the clear terminal CLR of the first D-type flip-flop 52 become the "L" level, and hence the first D-type flip-flop 52 is reset. Along with the reset, the output of the inverting output terminal /Q of the first D-type flip-flop 52 is changed from the "L" level to the "H" level. That is, the first D-type flip-flop 52 produces the first individual card running signal CLS1 at the "H" level at the time point $t_3$.

After that, until the common card running signal CLS falls again, the first D-type flip-flop 52 is in a reset period, and the inverting output terminal /Q of the first D-type flip-flop 52 continues to produce the "H" level.

Through the above-mentioned operation, the first individual card running signal CLS1 solely for the first track can be generated.

The control unit 14 monitors the individual card running signals (first to third individual card running signals) CLS1, CLS2, and CLS3 of the respective tracks supplied to the magnetic card data extraction circuit 13, and performs processing of analyzing the data signal of the track whose card running signal is determined to be "present". The individual card running signals (first to third individual card running signals) CLS1, CLS2, and CLS3 of the respective tracks are supplied to the magnetic card data extraction circuit 13, and are also produced to the terminal of the magnetic card data extraction circuit 13 connected to the control unit 14.

The control unit 14 determines that the "card loading signal is present" in a case where the individual card running signal becomes the "L" level, this state is maintained for a predetermined period of time (for example, substantially equal to or longer than a time period in which the individual card running signal is produced when the magnetic card is scanned at a maximum readable operating speed), and then the individual card running signal becomes "H".

As described above, the control unit 14 acts as a data analysis processing unit configured to determine the presence or absence of the track on the magnetic stripe of the magnetic card based on the presence or absence of the individual card running signal and to perform processing of analyzing the data signal only for the track determined to be present on the magnetic stripe.

As described above, FIGS. 6A to 6L are signal waveform diagrams of a case where a magnetic card (credit card) having three tracks on the magnetic stripe is read.

In contrast, FIGS. 7A to 7K are signal waveform diagrams of a case where a magnetic card (debit card) having only the JIS-II track on the magnetic stripe is read. Note that, the waveforms of FIGS. 7A to 7K differ from signals actually obtained from the magnetic card in the length of the card running signal and the number of clock signals.

Figure 7:
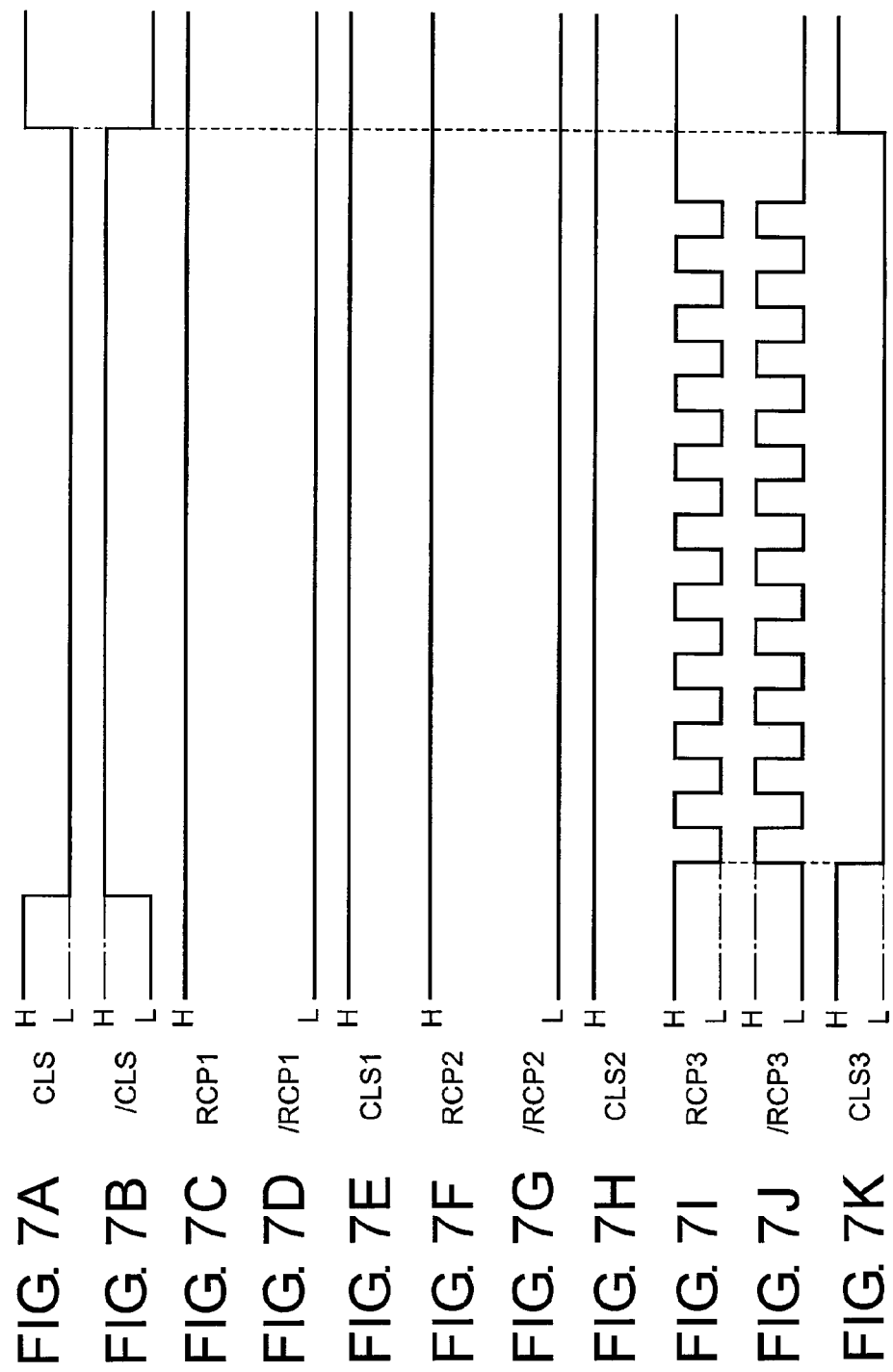
FIGS. 7A to 7K are signal waveform diagrams of a case where a magnetic card (debit card) having only JIS-II track on the magnetic stripe is read by the magnetic card reader illustrated in FIG. 1.

FIG. 7A illustrates a waveform of the common card running signal CLS, FIG. 7B illustrates a waveform of the inverted common card running signal /CLS, FIG. 7C illustrates a waveform of the first clock signal RCP1, FIG. 7D illustrates a waveform of the first inverted clock signal /RCP1, FIG. 7E illustrates a waveform of the first individual card running signal CLS1, FIG. 7F illustrates a waveform of the second clock signal RCP2, FIG. 7G illustrates a waveform of the second inverted clock signal /RCP2, FIG. 7H illustrates a waveform of the second individual card running signal CLS2, FIG. 7I illustrates a waveform of the third clock signal RCP3, FIG. 7J illustrates a waveform of the third inverted clock signal /RCP3, and FIG. 7K illustrates a waveform of the third individual card running signal CLS3.

As illustrated in FIG. 7I, the third clock signal RCP3 is produced by the JIS-II track that is the third track. Therefore, as illustrated in FIG. 7K, the third individual card running signal CLS3 is generated for the third track. However, as illustrated in FIGS. 7C and 7F, the first and second clock signals RCP1 and RCP2 are not produced by the first and second tracks. Therefore, as illustrated in FIGS. 7E and 7H, the first and second individual card running signals CLS1 and CLS2 are not generated for the first and second tracks.

Note that, signal waveforms of a case where a magnetic card (specific credit card) having only the ISO 2 track on the magnetic stripe is read are similar to those of FIGS. 7A to 7K, and hence illustration thereof is omitted.

As illustrated in FIGS. 6A to 6L, when the magnetic card (credit card) having three tracks on the magnetic stripe is read, the card running signal generation circuit 15 generates the first to third individual card running signals CLS1, CLS2, and CLS3. Therefore, the control unit (data analysis processing unit) 14 determines that the first to third tracks are present on the magnetic stripe of the read magnetic card, and performs processing of analyzing all of the first to third data signals of the first to third tracks. In this case, the control unit (data analysis processing unit) 14 transmits the read clock to the first to third data registers 138 of the magnetic card data extraction circuit 13 for the tracks determined to be present, reads the data signals held in the first to third data registers 138, and performs processing of analyzing the read data signals.

In contrast, as illustrated in FIGS. 7A to 7K, when the magnetic card (debit card) having only the JIS-II track on the magnetic stripe is read, the card running signal generation circuit 15 generates only the third individual card running signal CLS3. Therefore, the control unit (data analysis processing unit) 14 determines that only the third track is present on the magnetic stripe of the read magnetic card, and performs processing of analyzing only the third data signal of the third track. In this case, the control unit (data analysis processing unit) 14 transmits the read clock only to the third data register 138 of the magnetic card data extraction circuit 13 for the track determined to be present, reads the data signal held in the third data register 138, and performs processing of analyzing the read data signal.

Figure 8:
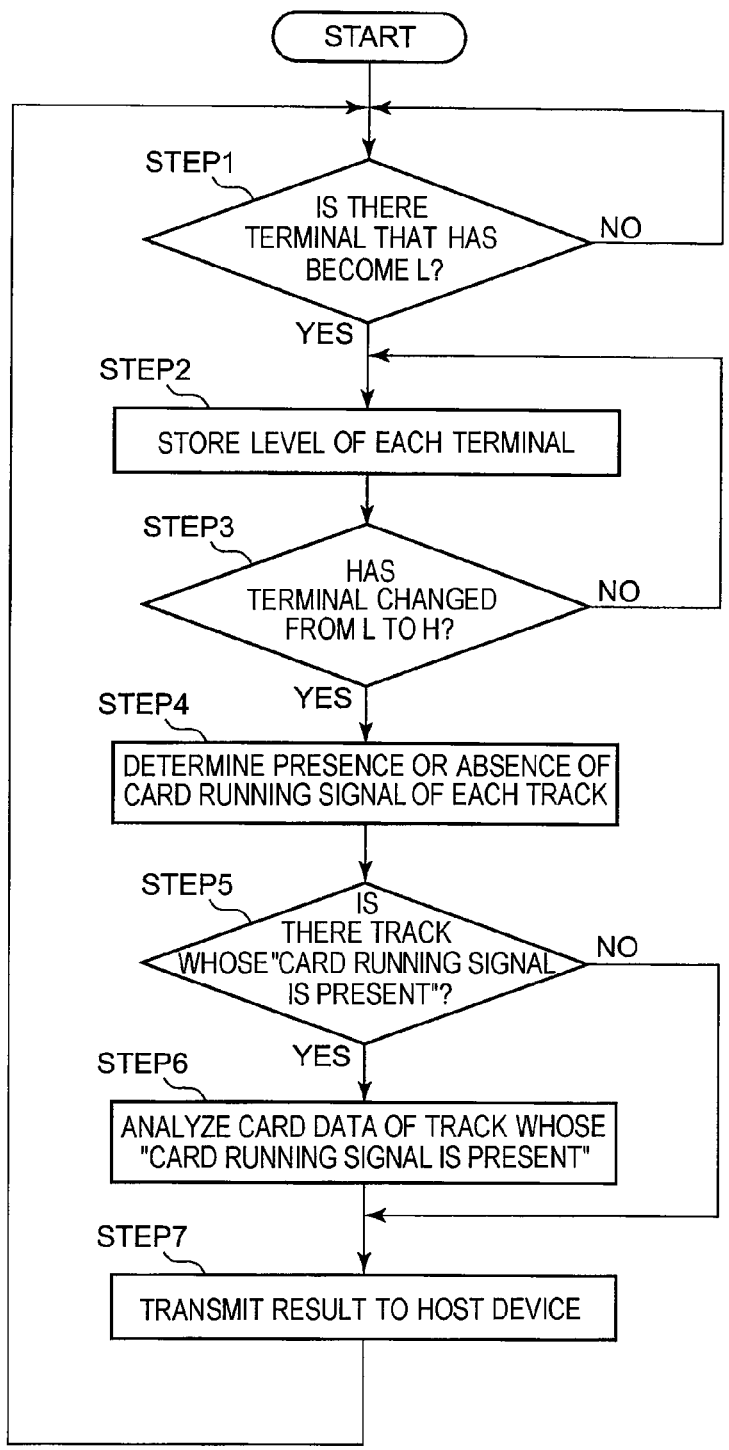
FIG. 8 is a flow chart illustrating an operation of a control unit used in the magnetic card reader illustrated in FIG. 1.

Next, with reference to FIG. 8, an operation of the control unit (data analysis processing unit) 14 will be described.

The control unit 14 monitors the individual card running signals (first to third individual card running signals) CLS1, CLS2, and CLS3 of the respective tracks to determine whether or not there is a terminal that has become the "L" level (STEP 1). When there is a terminal that has become the "L" level (YES in STEP 1), the control unit 14 stores the level of each terminal (STEP 2).

When the terminal has not changed from the "L" level to the "H" level (NO in STEP 3), the control unit 14 causes the processing to return to STEP 2.

When the terminal has changed from the "L" level to the "H" level (YES in STEP 3), the control unit 14 stores the level at this time, and then determines the presence or absence of the individual card running signal of each track based on the stored level of each terminal (STEP 4). Specifically, the control unit 14 determines that the "card running signal is present" in a case where the individual card running signal becomes the "L" level, this state is maintained for a predetermined period of time (for example, substantially equal to or longer than a time period in which the individual card running signal is produced when the card is scanned at a maximum readable operating speed), and then the individual card running signal becomes the "H" level.

When there is a track whose "card running signal is present" (YES in STEP 5), the control unit 14 analyzes the card data of the track whose "card running signal is present" (STEP 6), and transmits the result to the host device 16 (STEP 7). Note that, when there are a plurality of tracks whose "card running signals are present," the control unit 14 analyzes the card data items of those plurality of tracks, and transmits the results to the host device 16.

When there is no track whose "card running signal is present" (NO in STEP 5), the control unit 14 transmits the result that nothing was read to the host device 16.

Note that, also when the scanning of the magnetic card is too fast or the magnetic card is deviated from the conveyance path during the scanning, the control unit 14 determines that there is no track whose "card running signal is present."

Next, effects of the first example are described.

In the first example, the presence or absence of the track on the magnetic stripe of the magnetic card can be determined based on the generated individual card running signals (first to third individual card running signals) CLS1, CLS2, and CLS3 dedicated to the respective tracks. Therefore, it is possible to limit the processing of analyzing the card data to the track present on the magnetic stripe. The analysis processing is not performed to card data absent on the magnetic stripe, and hence it is possible to reduce unnecessary processing of the software in the control unit 14.

Therefore, according to the magnetic card reader 10 of the first example, the processing of analyzing the card data can be performed in an appropriate amount of time depending on the number of tracks.

Note that, in the above-mentioned first example, description has been given of a case where the magnetic head 11 reads magnetic data from three tracks present on the magnetic stripe of the magnetic card, and the single demodulation circuit 12 produces the single common card running signal common to all of the tracks and the clock signals (first to third clock signals) and data signals (first to third data signals) of the respective tracks. However, this invention is similarly applicable to a case where the magnetic head 11 reads magnetic data from two tracks present on the magnetic stripe of the magnetic card, and the single demodulation circuit 12 produces the single common card running signal common to all of the tracks and the clock signals (first and second clock signals) and data signals (first and second data signals) of the respective tracks.

Example 2

Figure 9:
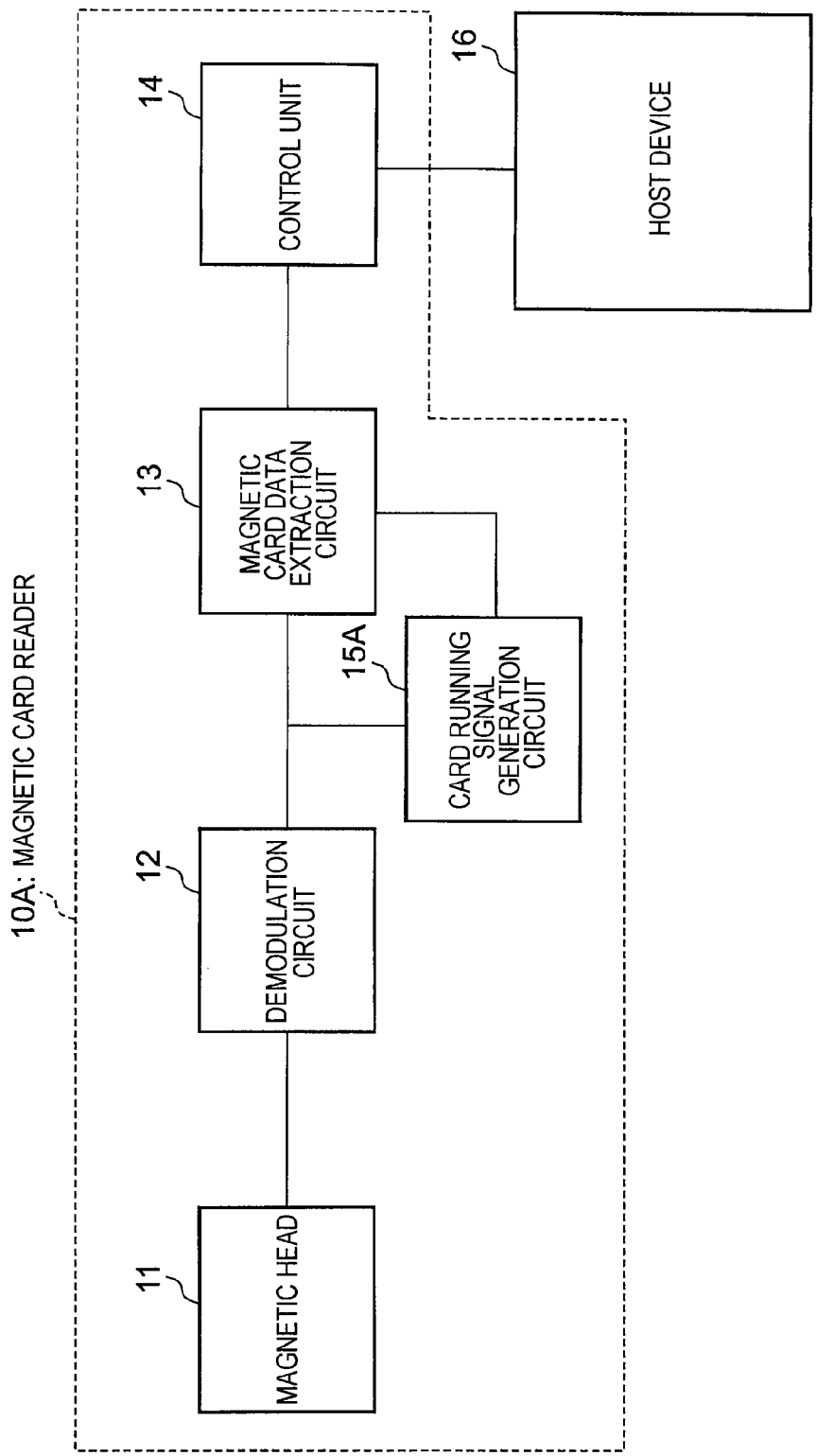
FIG. 9 is a block diagram illustrating a configuration of a magnetic card reader according to a second example of this invention.

FIG. 9 is a block diagram illustrating a configuration of a magnetic card reader 10A according to a second example of this invention. The illustrated magnetic card reader 10A has a similar configuration to the magnetic card reader 10 illustrated in FIG. 1 except that the configuration of the card running signal generation circuit is modified as described later, and operates similarly. Therefore, the card running signal generation circuit is denoted by reference symbol 15A. In the following, components having like functions as those in the magnetic card reader 10 according to the first example are denoted by like reference symbols, and only differences are described for simplifying the description.

The illustrated magnetic card reader 10A is a magnetic card reader configured to support reading of magnetic data from a magnetic card (not shown) having one to three tracks on a magnetic stripe.

In the second example, independent card running signals are separately generated for all of the tracks, and in addition, a part of the card running signals are produced as a common signal. Description is now given of an example of a case where the individual card running signals of the first track and the second track are used for the common signal, and only the individual card running signal of the third track is used for an independent signal.

Figure 10:
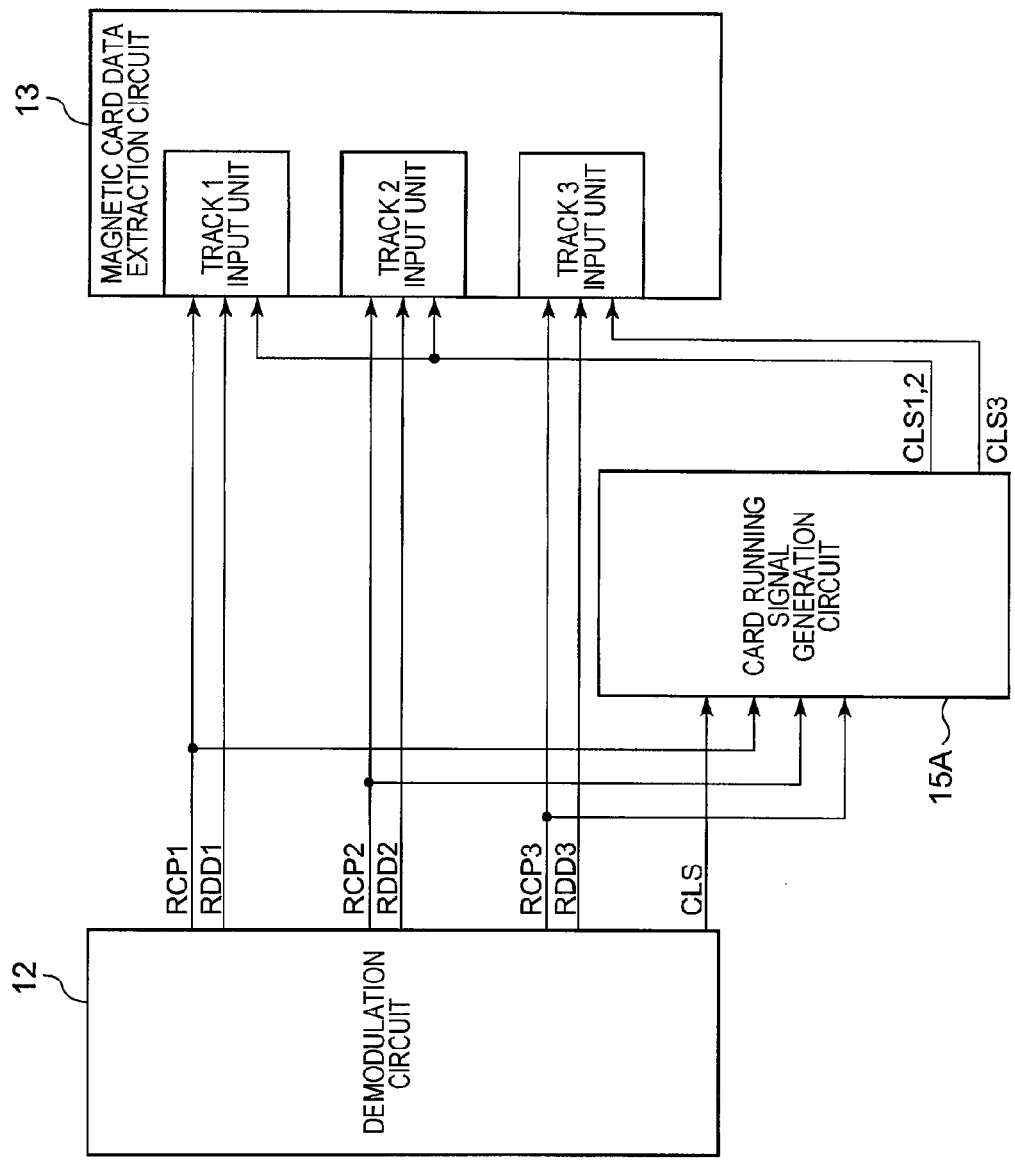
FIG. 10 is a block diagram illustrating wire connection of a demodulation circuit, a card running signal generation circuit, and a magnetic card data extraction circuit, which are used in the magnetic card reader illustrated in FIG. 9.

FIG. 10 is a block diagram illustrating wire connection of the demodulation circuit 12, the card running signal generation circuit 15A, and the magnetic card data extraction circuit 13 illustrated in FIG. 9.

Figure 11:
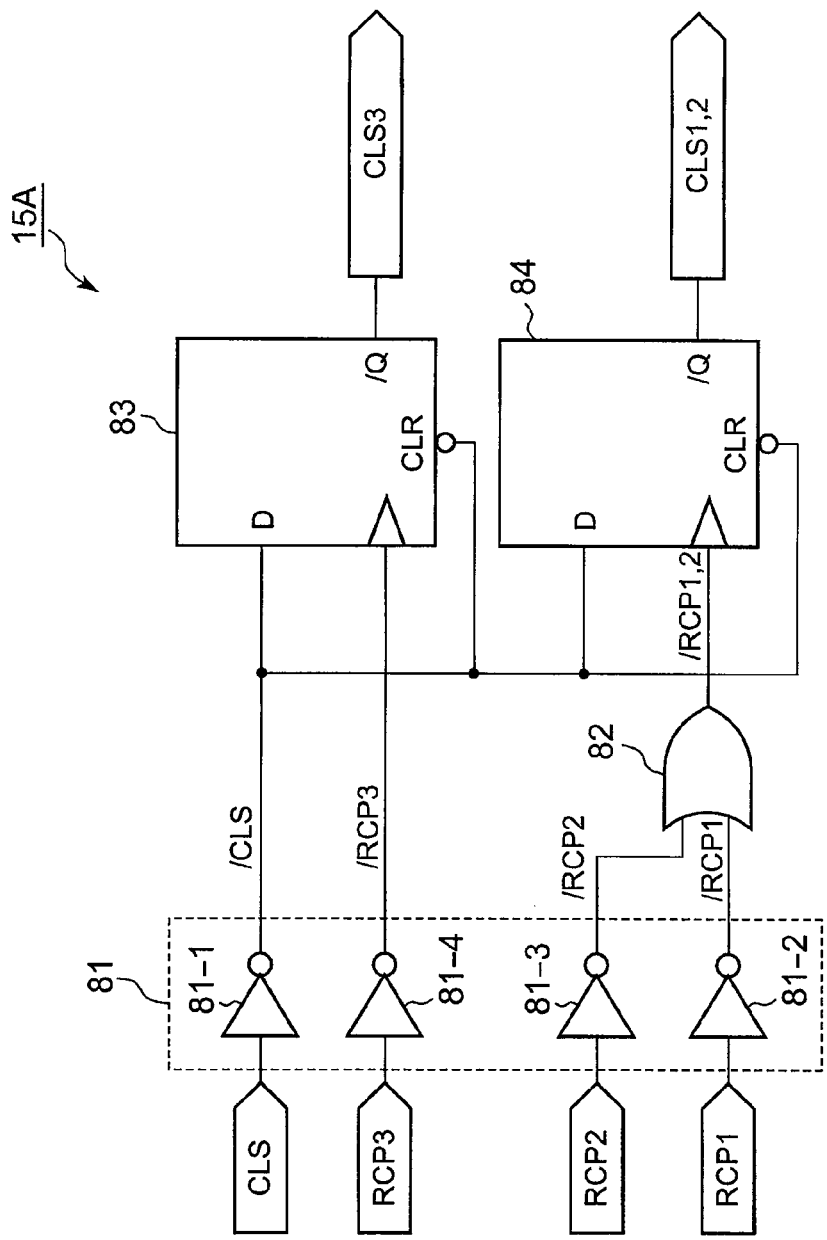
FIG. 11 is a block diagram specifically illustrating the card running signal generation circuit used in the magnetic card reader illustrated in FIG. 9.

FIG. 11 is a block diagram specifically illustrating the card running signal generation circuit 15A.

The illustrated card running signal generation circuit 15A comprises a NOT circuit 81, an OR gate 82, and first and second D-type flip-flops 83 and 84. The NOT circuit 81 comprises first through fourth inverters 81-1, 81-2, 81-3, and 81-4.

The first inverter 81-1 inverts the common card running signal CLS to produce the inverted common card running signal /CLS. The second inverter 81-2 inverts the first clock signal RCP1 dedicated to the first track to produce the first inverted clock signal /RCP1. The third inverter 81-3 inverts the second clock signal RCP2 dedicated to the second track to produce the second inverted clock signal /RCP2. The fourth inverter 81-4 inverts the third clock signal RCP3 dedicated to the third track to produce the third inverted clock signal /RCP3.

The OR gate 82 ORs the first inverted clock signal /RCP1 and the second inverted clock signal /RCP2 to produce an ORed inverted clock signal /RCP1,2.

The inverted common card running signal /CLS is supplied to data input terminals D and clear terminals CLR of the first and second D-type flip-flops 83 and 84. The third inverted clock signal /RCP3 is supplied to a clock input terminal CK of the first D-type flip-flop 83. The ORed inverted clock signal /RCP1,2 is supplied to a clock input terminal CK of the second D-type flip-flop 84.

The first D-type flip-flop 83 holds the inverted common card running signal /CLS in response to the third inverted clock signal /RCP3, and produces the held signal from its inverting output terminal /Q as the third individual card running signal CLS3 dedicated to the third track.

The second D-type flip-flop 84 holds the inverted common card running signal /CLS in response to the ORed inverted clock signal /RCP1,2, and produces the held signal from its inverting output terminal /Q as a combined card running signal CLS1,2 common to the first and second tracks.

As described above, the card loading signal generation circuit 15A generates, based on the common card running signal CLS and one of the first to third clock signals RCP1 to RCP3 of a specific track (in this example, the third clock signal RCP3), the individual card running signal of the specific track present on the magnetic stripe (in this example, the third individual card running signal CLS3), and generates, based on the common card running signal CLS and two of the first to third clock signals RCP1 to RCP3 of the remaining two tracks (in this example, the first and second clock signals RCP1 and RCP2), the combined card running signal CLS1,2 obtained by ORing the card running signals of the remaining two tracks present on the magnetic stripe.

The control unit 14 acts as the data analysis processing unit configured to determine the presence or absence of the track on the magnetic stripe of the read magnetic card based on the presence or absence of the individual card running signal CLS3 and the combined card running signal CLS1,2, and to perform processing of analyzing the data signal only for the track determined to be present on the magnetic stripe.

Further, the magnetic card data extraction circuit 13 comprises, for the respective tracks, the first to third data registers 138 (see FIG. 2) configured to hold first to third data signals RDD1 to RDD3 in synchronization with the first to third clock signals RCP1 to RCP3 based on the individual card running signal CLS3 and the combined card running signal CLS1,2.

Then, the control unit (data analysis processing unit) 14 transmits the read clock to any of the first to third data registers 138 of the magnetic card data extraction circuit 13 for the track determined to be present, reads the data signal held in the corresponding data register, and performs processing of analyzing the read data signal.

FIGS. 12A to 12I are signal waveform diagrams of a case where a magnetic card (credit card) having three tracks on the magnetic stripe is read. Note that, the waveforms of FIGS. 12A to 12I differ from signals actually obtained from the magnetic card in the length of the card loading signal and the number of clock signals.

FIG. 12A illustrates a waveform of the common card running signal CLS, FIG. 12B illustrates a waveform of the inverted common card running signal /CLS, FIG. 12C illustrates a waveform of the third clock signal RCP3, FIG. 12D illustrates a waveform of the third inverted clock signal /RCP3, FIG. 12E illustrates a waveform of the third individual card running signal CLS3, FIG. 12F illustrates a waveform of an ORed clock signal RCP1,2 obtained by ORing the first clock signal RCP1 and the second clock signal RCP2, FIG. 12G illustrates a waveform of the ORed inverted clock signal /RCP1,2, and FIG. 12H illustrates a waveform of the combined card running signal CLS1,2. Note that, FIG. 12I represents a time instant.

First, an operation for the third track having the independent individual card running signal will be described.

When the magnetic card is swiped through the magnetic head 11, simultaneously with the start of card running, at a time point $t_1$ of FIG. 12I, the common card running signal CLS falls from the "H" level to the "L" level. As a result, both inputs to the data input terminal D and the clear terminal CLR of the first D-type flip-flop 83 become the "H" level, and hence the reset of the first D-type flip-flop 83 is cancelled to become a state of waiting for an input of a clock.

At the time point $t_1$, there is still no input to the clock input terminal CK of the first D-type flip-flop 83, and hence the "H" level is produced by the inverting output terminal /Q of the first D-type flip-flop 83 similarly to the reset period. After that, at a time point $t_3$ of FIG. 12I, the third clock signal RCP3 falls. At the same time, the rising edge of the third inverted clock signal /RCP3 is supplied to the clock input terminal CK of the first D-type flip-flop 83. Therefore, the output of the inverting output terminal /Q of the first D-type flip-flop 83 changes from the "H" level to the "L" level. That is, the first D-type flip-flop 83 produces the third individual card running signal CLS3 at the "L" level from the time point $t_3$ (see FIG. 12E).

Simultaneously with the end of the running of the magnetic card through the magnetic head 11, at a time point $t_4$ of FIG. 12I, the common card running signal CLS rises. As a result, both inputs to the data input terminal D and the clear terminal CLR of the first D-type flip-flop 83 become the "L" level, and hence the first D-type flip-flop 83 is reset. Along with the reset, the output of the inverting output terminal /Q of the first D-type flip-flop 83 is changed from the "L" level to the "H" level. That is, the first D-type flip-flop 83 produces the third individual card running signal CLS3 at the "H" level at the time point $t_4$.

After that, until the common card running signal CLS falls again, the first D-type flip-flop 83 is in a reset period, and the inverting output terminal /Q of the first D-type flip-flop 83 continues to produce the "H" level.

Through the above-mentioned operation, the individual card running signal CLS3 solely for the third track can be generated.

Next, an operation for the first track and the second track will be described.

When the magnetic card is swiped through the magnetic head 11, at the time point $t_1$ of FIG. 12I, the common card running signal CLS falls from the "H" level to the "L" level. As a result, both inputs to the data input terminal D and the clear terminal CLR of the second D-type flip-flop 84 become the "H" level, and hence the reset of the second D-type flip-flop 84 is cancelled to become a state of waiting for an input of a clock.

At the time point $t_1$, there is still no input to the clock input terminal CK of the second D-type flip-flop 84, and hence the "H" level is produced by the inverting output terminal /Q of the second D-type flip-flop 84 similarly to the reset period. After that, at a time point $t_2$ of FIG. 12I, the first clock signal RCP1 or the second clock signal RCP2 falls. At the same time, the rising edge of the ORed inverted clock signal /RCP1,2 is supplied to the clock input terminal CK of the second D-type flip-flop 84. Therefore, the output of the inverting output terminal /Q of the second D-type flip-flop 84 changes from the "H" level to the "L" level. That is, the second D-type flip-flop 84 produces the combined card running signal CLS1,2 at the "L" level from the time point $t_2$ (see FIG. 12H).

Simultaneously with the end of the loading of the magnetic card through the magnetic head 11, at a time point $t_4$ of FIG. 12I, the common card running signal CLS rises. As a result, both inputs to the data input terminal D and the clear terminal CLR of the second D-type flip-flop 84 become the "L" level, and hence the second D-type flip-flop 84 is reset. Along with the reset, the output of the inverting output terminal /Q of the second D-type flip-flop 84 is changed from the "L" level to the "H" level. That is, the second D-type flip-flop 84 produces the combined card running signal CLS1,2 at the "H" level at the time point $t_4$.

After that, until the common card running signal CLS falls again, the second D-type flip-flop 84 is in a reset period, and the inverting output terminal /Q of the second D-type flip-flop 84 continues to produce the "H" level.

Through the above-mentioned operation, the combined card running signal CLS1,2 common to the first track and the second track can be generated.

Next, effects of the second example will be described.

In the second example, the presence or absence of the track on the magnetic stripe of the magnetic card can be determined based on the generated individual card running signal CLS3 dedicated to the track and the combined card running signal CLS1,2. Therefore, it is possible to limit processing of analyzing the card data to the track present on the magnetic stripe. The analysis processing is not performed to card data absent on the magnetic stripe, and hence it is possible to reduce unnecessary processing of the software in the control unit 14.

Therefore, according to the magnetic card reader 10A of the second example, the processing of analyzing the card data can be performed in an appropriate amount of time depending on the number of tracks.

Note that, in the above-mentioned second example, description has been given of a case where the card running signals of the first track and the second track are used for the common combined card running signal CLS1,2, and the card loading signal of the third track is used for the individual card running signal CLS3. However, this invention is similarly applicable to a case where the card running signals of the first track and the third track are used for a common combined card running signal CLS1,3, and the card running signal of the second track is used for the individual card running signal CLS2, or to a case where the card running signals of the second track and the third track are used for a common combined card running signal CLS2,3, and the card running signal of the first track is used for the individual card running signal CLS1.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

10, 10A magnetic card reader
11 magnetic head
12 demodulation circuit
13 magnetic card data extraction circuit
131, 132 inverter (NOT gate)
133 OR gate
134 D-type flip-flop
136, 137 selection circuit
138 data register
14 control unit (data analysis processing unit)
15, 15A card running signal generation circuit
16 host device
51 NOT circuit
51-1, 51-2, 51-3, 51-4 inverter
52, 53, 54 D-type flip-flop
81 NOT circuit
81-1, 81-2, 81-3, 81-4 inverter
82 OR gate
83, 84 D-type flip-flop
CLS common card running signal
/CLS inverted common card running signal
RCP1, RCP2, RCP3 clock signal
/RCP1, /RCP2, /RCP3 inverted clock signal
CLS1, CLS2, CLS3 individual card running signal
CLS1,2 combined card running signal This application is based upon and claims the benefit of priority from Japanese Patent Application No. 2012-077598, filed on Mar. 29, 2012, the disclosure of which is incorporated herein in its entirety by reference.

The invention claimed is:

1. A magnetic card reader, which is configured to support reading of magnetic data from a magnetic card having one to N tracks on a magnetic stripe, where N is an integer of 2 or more, the magnetic card reader comprising:
   a magnetic head configured to read, from the magnetic card, the magnetic data of each of tracks present on the magnetic stripe;

a single demodulation circuit configured to produce, based on the magnetic data, a single common card running signal obtained by ORing card running signals of the tracks present on the magnetic stripe, a clock signal of the each of the tracks present on the magnetic stripe, and a data signal of the each of the tracks present on the magnetic stripe;

a card running signal generation circuit configured to generate, based on the single common card running signal and the clock signal of the each of the tracks, an individual card running signal of the each of the tracks present on the magnetic stripe; and a data analysis processing unit configured to determine presence or absence of a track on the magnetic stripe based on presence or absence of the individual card running signal and to perform processing of analyzing the data signal only for the track determined to be present on the magnetic stripe.

2. A magnetic card reader according to claim 1, further comprising a magnetic card data extraction circuit comprising, for the each of the tracks, a data register configured to hold the data signal of the each of the tracks in synchronization with the clock signal of the each of the tracks based on the individual card running signal of the each of the tracks, wherein the data analysis processing unit is configured to transmit a read clock to the data register of the magnetic card data extraction circuit for the track determined to be present, read the data signal held in the data register, and perform the processing of analyzing the read data signal.

3. A magnetic card reader according to claim 1, wherein the N is 2 or 3.

4. A magnetic card reader according to claim 3, wherein the N is 3, and the single demodulation circuit produces first to third clock signals as the clock signal of the each of the tracks, and wherein the card running signal generation circuit comprises:

a NOT circuit configured to invert the single common card running signal and the first to third clock signals to produce an inverted common card running signal, a first inverted clock signal, a second inverted clock signal, and a third inverted clock signal;

a first D-type flip-flop configured to hold the inverted common card running signal in response to the first inverted clock signal to produce a first individual card running signal from an inverting output terminal of the first D-type flip-flop;

a second D-type flip-flop configured to hold the inverted common card running signal in response to the second inverted clock signal to produce a second individual card running signal from an inverting output terminal of the second D-type flip-flop; and a third D-type flip-flop configured to hold the inverted common card running signal in response to the third inverted clock signal to output a third individual card running signal from an inverting output terminal of the third D-type flip-flop.

5. A magnetic card reader, which is configured to support reading of magnetic data from a magnetic card having one to three tracks on a magnetic stripe, the magnetic card reader comprising:

a magnetic head configured to read, from the magnetic card, the magnetic data of each of tracks present on the magnetic stripe;

a single demodulation circuit configured to produce, based on the magnetic data, a single common card running signal obtained by ORing card running signals of the tracks present on the magnetic stripe, first to third clock signals of the three tracks present on the magnetic stripe, and first to third data signals of the three tracks present on the magnetic stripe;

a card running signal generation circuit configured to generate, by using the single common card running signal and one of the first to third clock signals of a specific track, an individual card running signal of the specific track present on the magnetic stripe, and generate, by using the single common card running signal and two of the first to third clock signals of remaining two tracks, a combined card running signal which is common to card running signals of the remaining two tracks present on the magnetic stripe; and a data analysis processing unit configured to determine presence or absence of a track on the magnetic stripe based on presence or absence of the individual card running signal and the combined card running signal and to perform processing of analyzing the data signal only for the track determined to be present on the magnetic stripe.

6. A magnetic card reader according to claim 5, further comprising a magnetic card data extraction circuit comprising, for the respective tracks, first to third data registers configured to hold the first to third data signals in synchronization with the first to third clock signals, respectively, based on the individual card running signal and the combined card running signal, wherein the data analysis processing unit is configured to transmit a read clock to any one of the first to third data registers of the magnetic card data extraction circuit for the track determined to be present, read the data signal held in the any one of the first to third data registers, and perform the processing of analyzing the read data signal.

7. A magnetic card reader according to claim 5, wherein the card loading signal generation circuit comprises:

a NOT circuit configured to invert the single common card running signal and the first to third clock signals to produce an inverted common card running signal, a first inverted clock signal, a second inverted clock signal, and a third inverted clock signal;

an OR gate configured to OR the first inverted clock signal and the second inverted clock signal to produce an ORed inverted clock signal;

a first D-type flip-flop configured to hold the inverted common card running signal in response to the third inverted clock signal to produce the individual card running signal from an inverting output terminal of the first D-type flip-flop; and a second D-type flip-flop configured to hold the inverted common card running signal in response to the ORed inverted clock signal to produce the combined card running signal from an inverting output terminal of the second D-type flip-flop.

* * * * *